Figure 1:
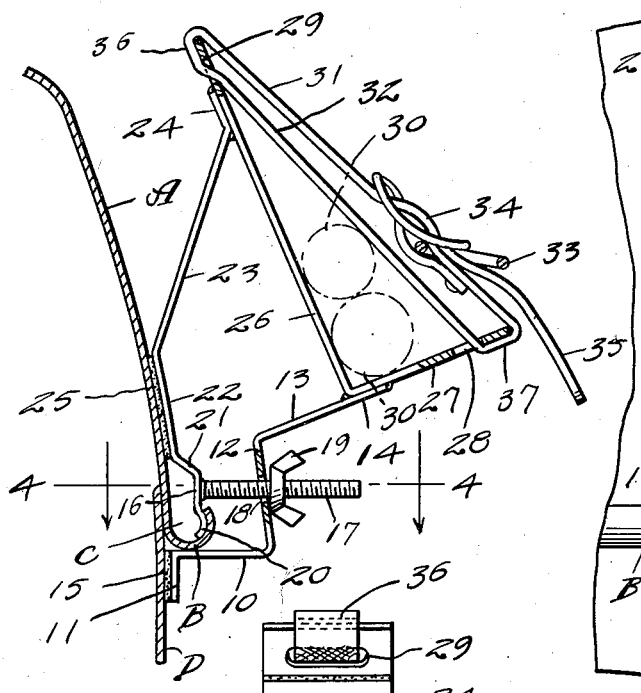

Feb. 15, 1949. J. W. HOPKINS 2,461,897
FISH POLE BRACKET FOR AUTOMOBILES
Filed March 8, 1946

Inventor
J. W. Hopkins
By Kimmel & Crowell Attorneys

Patented Feb. 15, 1949

2,461,897

UNITED STATES PATENT OFFICE 2,461,897

FISH POLE BRACKET FOR AUTOMOBILES

Jerold W. Hopkins, La Crosse, Wis., assignor of sixty-five per cent to R. C. Cheney, La Crosse, Wis., and twenty-five per cent to W. C. Cheney, Lake City, Minn.

Application March 8, 1946, Serial No. 653,000

4 Claims. (Cl. 224—42.45)

1

The present invention relates to improvements in means for supporting fish poles and like equipment upon an automobile or similar vehicle.

One of the objects thereof is to provide a simple, efficient and inexpensive bracket for attachment to the drip mold of an automobile and which is light, strong and convenient to attach and remove from the machine.

Another object thereof is to provide a bracket especially designed to support a fish pole and accessories upon the upper part and side of a self propelled vehicle or the like while in transit so the pole may extend longitudinally of the machine without obstructing contact with anything.

A still further object thereof is to provide a supporting device upon an automobile for fishing poles and the like equipment which requires nothing to be attached by screw fasteners or the like to the machine but which is anchored securely upon a side of the machine by surmounting friction of parts clamped onto the drip mold thereof.

Another object of this invention is to provide novel means for attaching a pair of brackets upon the side of an automobile in relation to the drip mold thereof in such a manner that they may be mounted in overlying position upon said side of the machine and clamped onto said drip mold, thereby permitting opposite ends of the fish pole to be supported in the brackets.

A final object thereof is to provide, in a device of the kind described novel means for holding the fish poles or other articles placed in the mentioned brackets against endwise displacement from the brackets.

With the above and other objects in view my invention consists in the combination, arrangement and details of construction disclosed in the drawings and specification, and then more particularly pointed out in the appended claims.

Figure 2:
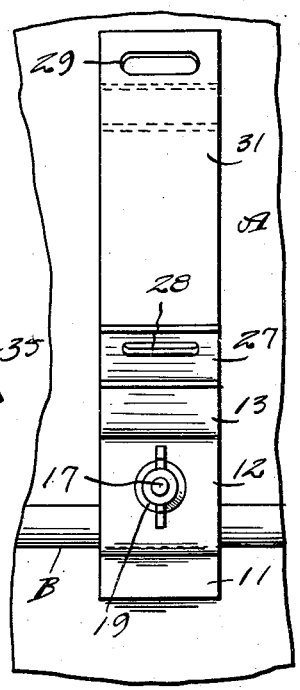
Figures 3, 4:
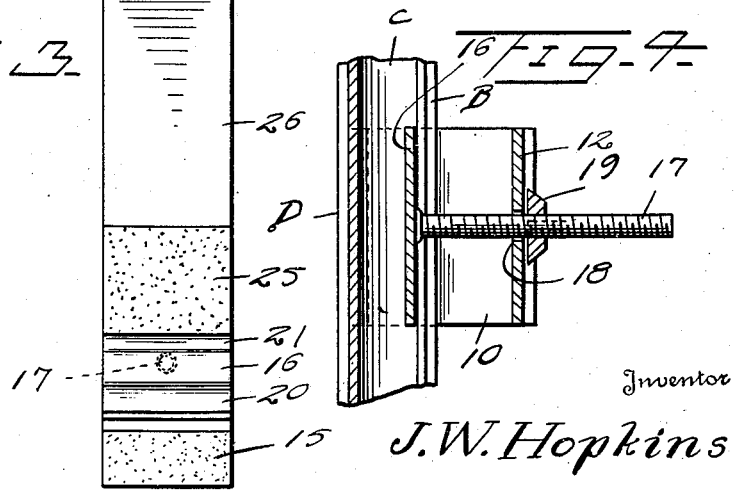

In the drawings, wherein similar reference characters designate similar parts throughout the respective views, Figure 1 is a side elevation of my invention partly in section applied to an automobile, Figure 2 is an end elevation thereof, Figure 3 is an opposite end elevation thereof, and Figure 4 is a fragmental sectional cross section of part of the clamping means of the bracket.

Referring to the drawings, which are merely illustrative of my invention the various parts thereof are disclosed. It will be understood that fish poles are usually very long, and extend oftentimes coextensively with the length of an automobile upon which it is desired to transport them

2 about. It is necessary so to position the poles exteriorly of the vehicle as not to cause them to interfere with lifting the front hood of the machine or opening and closing the side doors thereof, or otherwise handicap using any part of the machine. To this end I have designed a supporting device for fishing poles by virtue of which they may very conveniently be located and supported at the upper part of the automobile upon either side thereof where there is no likelihood that any part thereof will hazardly project from the machine.

In carrying out this purpose I devise a construction which consists of means for clamping a bracket upon the drip mold B which provides a longitudinal gutter C conventionally along the upper part of the machine upon one side D thereof, A indicating the top curved in portion of the body of the machine.

Between the bracket proper and the clamping means therefor are oppositely extending flexible metal strap members which hold the bracket attached to the machine at a lateral diagonal bias with respect to the adjacent side of the automobile. One of these metal strap members has a portion designed to extend horizontally outwardly from the side of the automobile, at 10, which part is formed with a right-angular portion 11 projecting in one direction from part 10, and another right angular portion 12 extending in a direction counter to that of the part 11 and at the opposite end of part 10. The latter portion is designated 12 and is shaped to provide a forwardly and upwardly bent arm 13. The part 12 of this member constitutes what shall be termed a bearing portion.

The other flexible metal strap member is angularly bent at certain parts of its length in such a manner that a short intermediate portion thereof 16 has the head of a screw bolt 17 operatively attached hereto at right angles so as to project laterally thereof. This part 16 terminates in a relatively short concavo-convex shaped jaw 20 designed to overlie snugly the similarly shaped hook-shaped edge of the drip mold B of the machine. The other end of the part 16 has formed at an obtuse angle thereto an integral portion 21, which is formed with an obtusely disposed abutment portion 22, part 21 extends to one side of part 16.

The part 22 of the member now being described has an obtusely disposed integral arm 23 formed thereupon, which terminates in an integral outturned lug 24. It will be seen that the screw bolt 17 projects loosely through an opening 18 in the bearing portion 12 of the first described strap member, and threaded upon this screw bolt in advance of bearing portion 12 is a wing or jamb nut 19. Overlying the outer faces of part 11 of one member is a rubber pliable pad 15 and similarly overlying the part 22 of the other strap member is a rubber pad 25.

An article supporting the carrying bracket of flexible strap parts, consists of a short arm 27 secured at its inner end to the outer end of arm 13 of one member at 14, and of a longer right angular arm 26 to which the lug 24 of the other strap member is operatively secured. Short of the outer end of arm 27 of the bracket a slot 28 is formed, and short of the outer end of the long arm 26 of the bracket another slot 29 is located which clears the lug 24.

It will be observed that the outer end of arm 23 is located in closer proximity to the adjacent side of the automobile than the outer end of the arm 13 or outer end of arm 27 of the bracket. This assures that the bracket will be supported diagonally with respect to the vertical so as to incline in the same direction as the upper part of the vehicle curves as at A. This bias assumed by the bracket contributed by the location of arms 13 and 23 of both members, is responsible for placing the fish poles 30 in a tier upon the bracket with the lowermost pole lying in the crotch of the bracket, bearing both upon the short arm 27 and long arm 26 of the bracket. In order to frictionally confine the poles against displacement from the bracket use is made of a belt or flexible strap of conventional construction.

This flexible strap has one stretch thereof 32 spanning the diagonal distance across from the outer end of the short arm 27 to the outer end of the long arm 26 of the bracket, at which ends of the arms it passes through both slots 28 and 29 of these arms, then is turned around the corners of these arms and brought back over stretch 32, as at 31, so opposite bight portions of the strap, indicated at 36 and 37 respectively, are looped around the outer ends of the arms adjustably, and then their ends 34 and 35 are passed about and through the strap buckle 33 and properly and operatively secured. In tightening these ends of the strap, therefore, tension is applied to stretch 32 thereof which presses this part of the strap frictionally and tangentially of the fish poles lodged in the bracket.

The proper way to clamp the device upon the drip mold of the automobile is shown in Figure 1. Parts 25 and 15 of the two strap members, being rubber pads, are brought into contact with the adjacent side of the automobile, by locating the jaw 20 of the first member in the gutter C of the drip mold B, and by tightening the hold of the wing nut 19 upon the screw bolt 17 and against the bearing portion 12 of the opposite member. As the wing nut is turned upon the screw bolt and advanced thereupon in the direction of the automobile, it will be seen that parts 12 and 20 of the two members are pressed towards each other, so that jaw 20 clamps the drip mold B and wing nut clamps the bearing portion 12. As this takes place the rubber pad 15 on part 11 of one member is also pressed against the side of the automobile, in the act of pressing the bearing portion inwardly towards the automobile. The member 22 having arm 23 serves as a bracing means for the bracket. This arm 23, being flexible, the force of the nut 19 on the bearing surface 12 and on the bolt 17 will force the bracing arm 23 to contact the rubber pad 25 overlying part 22 of arm 23 against the adjacent side of the automobile.

It will be understood that a pair of the brackets and clamps disclosed herein will be needed for attachment to opposite ends of the automobile to the drip mold thereof in the manner already explained herein. In this way it is assured that the poles will be supported at opposite ends thereof upon the two brackets so as to extend longitudinally of the sides of the machine along one side thereof. Vibration of the machine will impart vibration to the flexible parts of the support herein set forth without dislodging the fishing poles from their supports. By loosening the hold of the wing nuts on the bearing portions 12 of the brackets clamps, the device can readily be removed from the machine and leave no trace of marks upon the side of the machine.

I do not mean to confine myself to the exact details of construction herein disclosed but claim all variations falling within the purview of the appended claims.

What I desire to claim is:

1. A bracket for attachment to the drip mold of a vehicle, supporting arms for said bracket, one of said arms being shaped to provide a jaw of a clamp and an abutment engaging the side of the vehicle, the other arm being shaped to provide a second jaw for said clamp disposed in opposition to the first jaw and also an abutment for engaging the same side of the vehicle, the first jaw of the clamp engaging within said drip mold, manually operable means for vising the jaws against the side of the vehicle and said drip mold, and means for supporting articles in said bracket against displacement therefrom.

2. In combination with an automobile having a drip mold, a flexible metal strap extending horizontally adjacent to one side of the automobile and having a right angular terminal abutting said side, and also formed with a right angular bearing portion projecting in a direction counter to said right angular terminal in spaced relation opposite to said drip mold, a second flexible metal strap having a part also abutting the mentioned side of the automobile, and also formed with an integral offset portion projecting beyond the foregoing part to engage within the drip mold frictionally, a screw bolt having one end rigidly connected to the offset portion and another end adjustably projecting through said bearing portion, a wing nut threaded on said screw bolt jambing said bearing portion for thrusting clampingly the automobile engaging parts and the drip mold engaging parts of said metal straps in opposing directions, and means conjointly carried by both metal straps for supporting an article to be transported by said automobile.

3. A fish pole supporting bracket for attachment to the drip mold of a vehicle comprising a pair of bracket supporting arms, one of said arms being shaped to provide a jaw of a clamp engageable within said drip mold and an abutment engaging the side of the vehicle, the other arm being shaped to provide a second jaw for said clamp in opposition to said first jaw and also an abutment for engaging the same side of the vehicle, manually operable means engaging said arms for clamping the jaws against the side of the vehicle and said drip mold, and means for supporting a fish pole in said bracket against displacement therefrom.

4. A fish pole supporting bracket for attachment to the drip mold of a vehicle comprising a pair of bracket supporting arms, one of said arms being shaped to provide a jaw of a clamp engageable within said drip mold and an abutment engaging the side of the vehicle, above said drip mold, the other arm being shaped to provide a second jaw for said clamp in opposition to said first jaw and also an abutment for engaging the same side of the vehicle below said drip mold, manually operable means engaging said arms for clamping the jaws against the side of the vehicle and said drip mold, and means for supporting a fish pole in said bracket against displacement therefrom.

JEROLD W. HOPKINS.

REFERENCES CITED

The following references are of record in the file of this patent:

UNITED STATES PATENTS

| Number | Name | Date |
| --- | --- | --- |
| 1,221,559 | Mergen et al. | Apr. 3, 1917 |
| 1,733,007 | Dahl | Oct. 22, 1929 |
| 1,748,282 | Ellis | Feb. 25, 1930 |
| 2,235,012 | Colvin | June 29, 1937 |
| 2,268,958 | Parten | Jan. 6, 1942 |